United States Patent
Aarts et al.

(10) Patent No.: US 9,086,933 B2
(45) Date of Patent: Jul. 21, 2015

(54) SYSTEM AND METHOD FOR LAUNCHING CALLABLE FUNCTIONS

(71) Applicant: Nvidia Corporation, Santa Clara, CA (US)

(72) Inventors: Bastiaan Aarts, San Jose, CA (US); Luke Durant, Santa Clara, CA (US); Girish Bharambe, Pune (IN); Vinod Grover, Mercer Island, WA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 13/632,334

(22) Filed: Oct. 1, 2012

(65) Prior Publication Data

US 2014/0096147 A1    Apr. 3, 2014

(51) Int. Cl.
*G06F 9/54* (2006.01)
*G06F 9/44* (2006.01)

(52) U.S. Cl.
CPC ............. *G06F 9/541* (2013.01); *G06F 9/4411* (2013.01); *G06F 9/4425* (2013.01); *G06F 8/30* (2013.01)

(58) Field of Classification Search
CPC .......................... G06F 9/4411; G06F 9/4425
See application file for complete search history.

(56) References Cited

U.S. PATENT DOCUMENTS

| | | | |
|---|---|---|---|
| 5,083,262 A * | 1/1992 | Haff, Jr. | 703/27 |
| 6,965,902 B1 * | 11/2005 | Ghatate | 1/1 |
| 8,627,042 B2 | 1/2014 | Eichenberger et al. | |
| 2004/0139439 A1 * | 7/2004 | Machida et al. | 718/105 |
| 2007/0016905 A1 * | 1/2007 | Rector et al. | 718/100 |
| 2007/0038572 A1 | 2/2007 | Pastorelli et al. | |
| 2012/0324484 A1 * | 12/2012 | Fried et al. | 719/331 |
| 2013/0054669 A1 * | 2/2013 | Nachreiner et al. | 709/201 |
| 2013/0159966 A1 * | 6/2013 | Goertz | 717/106 |

FOREIGN PATENT DOCUMENTS

TW        201140448 A    11/2011

OTHER PUBLICATIONS

Foreign Communication from a Related Counterpart Application; Taiwanese Patent Application No. 102132847; Office Action dated Jan. 7, 2015; 8 pages.

* cited by examiner

*Primary Examiner* — Charles E Anya

(57) ABSTRACT

A system and method are provided for launching a callable function. A processing system includes a host processor, a graphics processing unit, and a driver for launching a callable function. The driver is adapted to recognize at load time of a program that a first function within the program is a callable function. The driver is further adapted to generate a second function. The second function is adapted to receive arguments and translate the arguments from a calling convention for launching a function into a calling convention for calling a callable function. The second function is further adapted to call the first function using the translated arguments. The driver is also adapted to receive from the host processor or the GPU a procedure call representing a launch of the first function and, in response, launch the second function.

14 Claims, 1 Drawing Sheet

SYSTEM AND METHOD FOR LAUNCHING CALLABLE FUNCTIONS

TECHNICAL FIELD

This application is directed, in general, to multi-threaded parallel processing systems and, more specifically, to launching a callable function.

BACKGROUND

In graphical processing and other processing domains, programs are often required to operate on a large collection of data points, including such collections as an image or an audio file. Frequently, such programs may advantageously be structured as a sequence of actions, each of which may be performed simultaneously on all data points in the collection.

One type of processing system designed to support such programs is referred to as a Single Instruction, Multiple Data, (SIMD) system. A SIMD system provides a plurality of processors, each of which applies the instructions of the program to a single data point. In hardware, subsets of the plurality of processors may be implemented as multiprocessing units (MPUs).

SUMMARY

One aspect provides a driver for launching a callable function. The driver is adapted to recognize at load time of a program that a first function within the program is callable function. The driver is further adapted to generate a second function. The second function is adapted to receive arguments and translate the arguments from a calling convention for launching a function into a calling convention for calling a callable function. The second function is further adapted to call the first function using the translated arguments. The driver is also adapted to receive a procedure call representing a launch of the first function and, in response, launch the second function.

Another aspect provides a method for launching a callable function. The method includes recognizing at load time of a program that a first function within the program is a callable function. The method also includes generating program code for a second function. The second function receives arguments and translates the arguments from a calling convention for launching a function into a calling convention for calling a callable function. The second function also calls the first function using the translated arguments. The method further includes launching the second function, in response to receiving a procedure call representing a launch of the first function.

Yet another aspect provides a processing system that includes a host processor, a graphics processing unit, and a driver for launching a callable function. The driver is adapted to recognize at load time of a program that a first function within the program is a callable function. The driver is further adapted to generate a second function. The second function is adapted to receive arguments and translate the arguments from a calling convention for launching a function into a calling convention for calling a callable function. The second function is further adapted to call the first function using the translated arguments. The driver is also adapted to receive from the host processor or the GPU a procedure call representing a launch of the first function and, in response, launch the second function.

BRIEF DESCRIPTION

Reference is now made to the following descriptions taken in conjunction with the accompanying drawings, in which.

DETAILED DESCRIPTION

Figure 1:
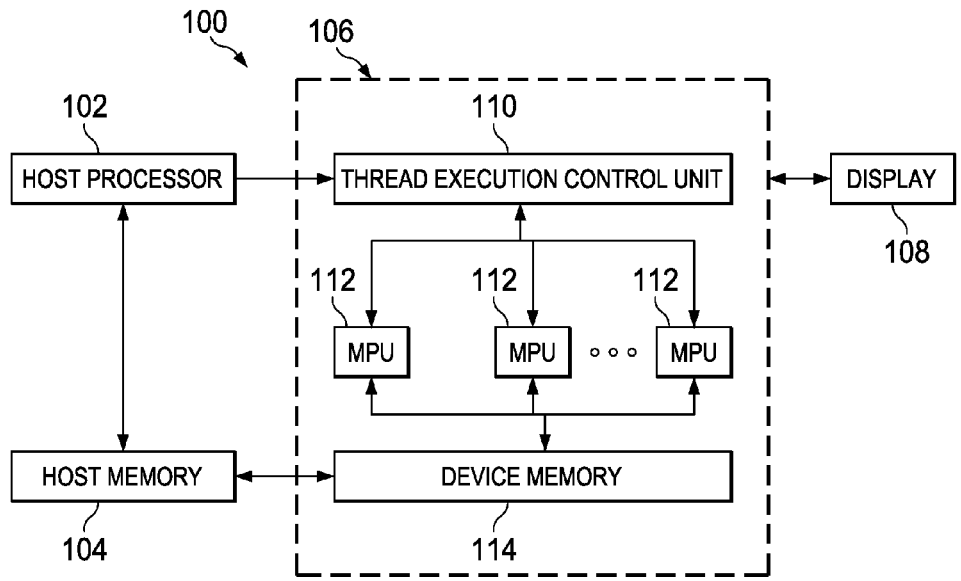
FIG. 1 is a schematic view of a system according to the disclosure.

FIG. 1 is a schematic view of a system 100 according to the disclosure. The system includes a host processor 102 coupled to a host memory 104 and to a graphics processing unit (GPU) 106. The GPU 106 is also coupled to the host memory 104 and may write data to and read data from the host memory 104 using direct memory access (DMA).

The GPU 106 is also coupled to a display 108 or other output device and is adapted to display information generated by the GPU 106 using the display 108. In other embodiments, the display 108 may also, or alternatively, be coupled to the host processor 102 for the display of information generated by the host processor 102.

The GPU 106 includes a plurality of multiprocessing units (MPUs) 112 under the control of a thread execution control unit (TECU) 110. The TECU 110 is coupled to the host processor 102 and adapted to receive control signals from the host processor 102. The MPUs 112 are coupled to a device memory 114 and are adapted to write data to and read data from the device memory 114. The device memory 114 is coupled to the host memory 104 and adapted to write data to and read data from the host memory 104.

The host processor 102 may execute a program structured as a sequence of SIMD programs. Such programs may be referred to as kernels. As part of executing the program, the host processor 102 may launch the sequence of kernels in the GPU 106.

The GPU 106 provides a parallel computing architecture that arranges parallel work into a hierarchy of threads, thread blocks (or simply blocks) and grids. A grid is a collection of threads, all of which execute a common kernel. An individual thread executes its kernel as a standalone entity, with independent data, stack and program counter. Threads are grouped into thread blocks of user-defined size (number of threads in the block). Threads within a block are guaranteed to execute concurrently.

For assignment to, and execution by, MPUs 112, the threads of a block may be divided into subsets. These subsets may be referred to as a warp or wavefront. The size of a subset is typically selected as a power-of-two multiple (i.e., 1, 2, 4, etc.) of the number of processors in an MPU 112. The threads of a warp are assigned to a single MPU 112 and the MPU 112 executes one instruction of the threads of the warp in a corresponding 1, 2, 4, etc. number of clock cycles.

The threads of a block may be synchronized using a barrier operation (or simply barrier). Often, a barrier is used to enforce an ordering constraint on memory operations issued before and after the barrier. Once a thread reaches a barrier, it cannot proceed until all threads have reached the barrier.

While the processing unit 106 is referred to herein as a graphics processing unit, it will be understood that the processing unit 106 may be used for data processing that may be unrelated to graphics—that is, in any application requiring multi-threaded, SIMD processing. In other embodiments, the processing unit 106 may incorporate circuitry optimized for general purpose processing, while preserving the underlying computational architecture described herein.

The host processor 102 includes one or more subsystems adapted to receive programs stored on one or more types of computer readable medium. The phrase "computer readable medium" includes any type of medium capable of being accessed by a computer, such as read only memory (ROM), random access memory (RAM), a hard disk drive, a compact disc (CD), a digital video disc or digital versatile disc (DVD), or any other type of medium.

Some functions that are executed by the host processor 102 and the GPU 106 may be characterized as "launchable" functions. Other such functions may be characterized as "callable" functions.

The difference between a launchable function and a callable function is typically not visible from the "callee side," that is, from within the function. However, the difference may be seen on the caller's side. A launchable function is called from within one thread (either on the host processor 102 or on one of the MPUs 112) and spawns many other threads. In contrast, a callable function is called from within one thread (on one of the MPUs 112) and executing continues on the calling thread.

Callable functions that perform a processing task which, later, is to be applied to a plurality of data points must be rewritten into launchable form. If both callable and launchable versions of the function continue to be used, then changes made to the data processing functions of one version must be replicated in the other version, to maintain compatibility between the versions.

In some cases, a launchable version of a callable function may be created by writing a "wrapper" function, which is launchable and simply calls the callable function. However, a separate wrapper program must be written by hand for each callable function for which launch capability is desired. Further, when any change is made to the parameters of the callable function, the wrapper function also must be modified to adapt to the change.

Embodiments of the disclosure provide a driver that recognizes at load time of a program which functions of the program are callable and performs actions to enable the callable function to be launched.

Through use of drivers according to the disclosure, the need to have both callable and launchable functions (or routines) is eliminated. All compute languages used for multi-threaded processing (CUDA, OpenCL, C++AMP, etc.) currently incorporate the distinction between callable and launchable functions. Drivers according to the disclosure permit programmers to write only callable functions, which is a step toward heterogeneous computing, as such drivers will allow any callable function to be launched.

Table 1 presents code implementing one embodiment of the disclosure, where f is the callable function:

TABLE 1

| | |
|---|---|
| A | metaData f_meta_data; |
| B | metaData *fgm(void)<br>{<br>  return &f_meta_data;<br>} |
| C | void fgl (<arguments>)<br>{<br>  <arguments> = translate-calling-convention(<arguments>) ;<br>  f(<arguments>) ;<br>} |

TABLE 1-continued

| | |
|---|---|
| D | cnp_launch(void *f)<br>{<br>  metaData *md = (f-8) ( ) ;<br>  use md to configure launch;<br>  launch(f-4) ;<br>} |

Section A of Table 1 declares f_meta_data, metadata used in configuring a launch of callable function f. Such meta data may include resource requirements of the function/kernel (e.g., number of registers required, amount of shared memory, etc.) or locations of resources needed for execution (e.g., constant banks, etc). Metadata may also include a starting program counter (PC) of the function/kernel, any information needed for error checking (e.g., kernel cannot be launched with some number of threads, etc.), or any other architecture or application specific information needed for the kernel.

Section B is a callable function fgm, which returns a pointer to f_meta_data. Section C is a launchable function fgl, which receives <arguments> as a parameter and translates them from a convention used for launching a launchable function into a convention used for calling a callable function, and then calls f with the translated arguments.

Section D is a callable function cnp_launch, which may be used by a program executing in the GPU 106 to launch a callable function. The function cnp_launch receives as an input variable a pointer to the callable function in memory, obtains a pointer to the metadata for f, uses the metadata to configure the launch of f, then launches f. Additional description of cnp_launch is given below, after description of Table 2.

Table 2 presents a schematic representation of a memory image generated by a driver according to the disclosure:

TABLE 2

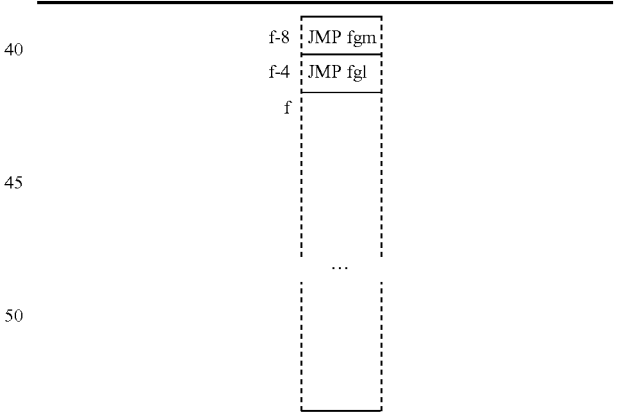

In Table 2, executable binary code for the callable function is stored in memory starting at address f. Memory at address f-4 contains an instruction that branches to function fgl, and memory at address f-8 contains an instruction that branches to function fgm.

In some embodiments, Table 2 is generated by the driver at load time by copying the code for function f from its original location in the compiled binaries to a new location having memory space for the jump instructions at f-4 and f-8. In other embodiments, a compiler may allocate memory space for the two jump instructions in the compiled binaries. In both embodiments, once the driver generates the functions fgm and fgl at load time, it writes the jump instructions into f-4 and f-8, using the addresses of the generated functions fgm and fgl.

Returning to Table 1, in a first step of the function cnp_launch, the function fgm is called by calling f-8, which in turn jumps to function fgm, returning &md, a pointer to the metadata for the function f. In a second step, the metadata pointed to by and is used to configure a launch of function f. Finally, function f is launched by calling f-4, which jumps to function fgl.

Where the function f is to be launched by a program running on the host processor 102, the steps of obtaining metadata and configuring the launch are performed by the driver. The host processor 102 launches function f but internally, the driver launches function gfl. Thus, there are two ways to launch function f: from one of the MPUs 112 (i.e., from the GPU 106), or from the host processor 102.

In the data structure of Table 2, the binary code for the function f remains unchanged. Programs and functions that call the function f (rather than launch it) also remain unchanged—they simply jump to the binary code, as they did before. Furthermore, the application binary interface (ABI) of function f is unchanged, making the generated code invisible to debuggers and profilers.

Figure 2:
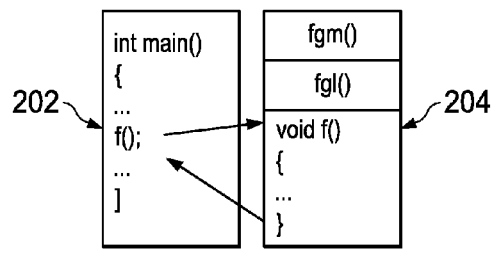
FIG. 2 is a schematic view of a program calling a function according to the disclosure.

FIG. 2 is a schematic view of a program 202 calling a function according to the disclosure. Memory block 204 is generated by a driver according to the disclosure when it recognizes that a program including the callable function f is (or has been) loaded. The memory block 204 contains the executable binary code of Table 2. The program 202 performs a conventional procedure call to the function f, and program control transfers to the memory location f in memory block 204. When execution of the function f is completed, program control returns to the program 202, to the statement following the procedure call to the function f.

Figure 3:
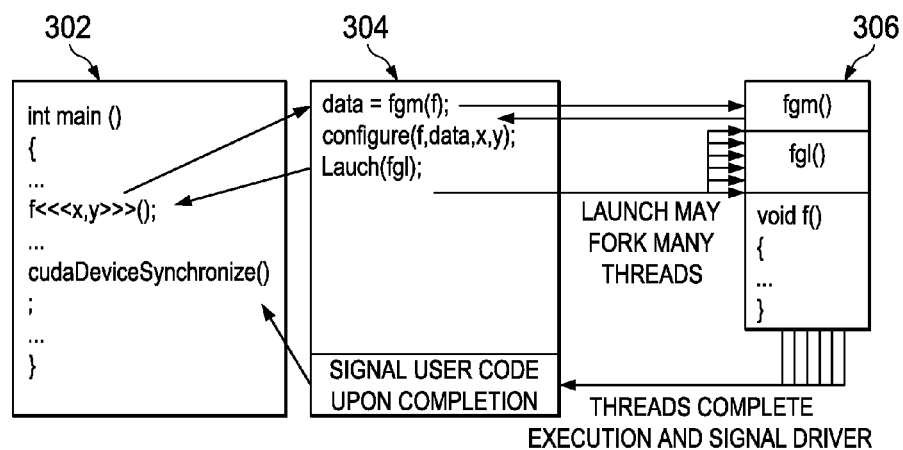
FIG. 3 is a schematic view of a program launching a callable function according to the disclosure.

FIG. 3 is a schematic view of a program 302 launching a callable function according to the disclosure. In the program 302, the statement f<<<x,y>>>( ) is an instruction to launch the function f with launch parameters x and y. Where the function f is to operate on a first collection of data points and return its results in a second collection of data points, pointers to the collections may be passed as parameters, within the parentheses at the end of the launch statement.

In this example, the program 302 is running on the GPU 106, or host processor 102. A driver according to the disclosure receives the launch procedure call and executes the function cnp_launch in the program 304, which is generated by the driver when it recognizes that a program including the callable function f is (or has been) loaded. The function cnp_launch executes the jump to function fgm and receives the return value data, a metadata pointer. The function cnp_launch then configures the launch of the function fgl based on the metadata data and the launch parameters x and y. In some embodiments, the identity of the function f may also be used to configure the launch of the function fgl. Finally, the function cnp_launch launches one or more threads executing the launchable function fgl.

In some embodiments, the threads signal the program 304 upon completion of the function fgl. In some such embodiments, the program 304 has returned to the program 302 once the threads have been launched. In these embodiments, once the program 304 has received signals from a desired number of the threads (typically, all the threads), the program 304 signals the program 302 that execution of the launched function f has been completed.

Those skilled in the art to which this application relates will appreciate that other and further additions, deletions, substitutions and modifications may be made to the described embodiments.

What is claimed is:

1. A driver for launching a callable function, wherein the driver:
   recognizes at load time of a program that a first function within the program is a callable function;
   generates a second function which:
      receives arguments,
      translates the arguments from a calling convention for launching a function into a calling convention for calling a callable function, and
      calls the first function using the translated arguments;
   receives a procedure call representing a launch of the first function and, in response, launches the second function, wherein information identifying a collection of data points is received in the procedure call;
   launches a plurality of threads, each thread executing the second function for a subset of the data points; and
   in response to the procedure call and prior to launching the second function:
      allocates metadata for the first function, wherein the metadata include resource requirements of the first function or locations of resources needed for execution; and
      configures the launch of the second function using the metadata.

2. The driver of claim 1, wherein the driver further:
   generates a third function which returns a pointer to the allocated metadata; and
   calls the third function and uses the returned pointer in configuring the launch of the second function.

3. The driver of claim 2, wherein the driver further relocates the first function in memory to a location adjacent to instructions branching to the second and third functions.

4. The driver of claim 1, wherein the driver further receives signals from one or more of the threads upon completion of the second function by the one or more threads.

5. The driver of claim 4, wherein the driver further:
   returns from the procedure call upon launching the plurality of threads; and
   signals completion of the second function in the threads using a synchronization barrier.

6. A method for launching a callable function, the method comprising:
   recognizing at load time of a program that a first function of the program is a callable function;
   generating program code for a second function, wherein the second function:
      receives arguments,
      translates the arguments from a calling convention for launching a function into a calling convention for calling a callable function, and
      calls the first function using the translated arguments;
   in response to receiving a procedure call representing a launch of the first function, launching the second function, wherein information identifying a collection of data points is received in the procedure call;
   launching a plurality of threads, each thread executing the second function for a subset of the data points; and
   in response to receiving the procedure call:
      allocating metadata for the first function, wherein the metadata include resource requirements of the first function or locations of resources needed for execution; and configuring the launch of the second function using the metadata.

7. The method of claim 6, further comprising:
generating program code for a third function, the third function returning a pointer to the allocated metadata,
wherein the configuring the launch of the second function further comprises:
calling the third function; and
using the returned pointer in configuring the launch of the second function.

8. The method of claim 7, further comprising:
relocating the first function in memory to a location adjacent to instructions branching to the second and third functions.

9. The method of claim 6, further comprising:
returning from the procedure call upon launching the plurality of threads;
receiving signals from one or more of the threads upon completion of the second function by the one or more threads; and
in response to the receipt of the signals, signaling completion of the second function in the threads using a synchronization barrier.

10. A processing system, comprising:
a host processor;
a graphics processing unit (GPU); and
a driver for launching a callable function, wherein the driver:
recognizes at load time of a program that a first function within the program is a callable function;
generates a second function which:
receives arguments,
translates the arguments from a calling convention for launching a function into a calling convention for calling a callable function, and
calls the first function using the translated arguments;
receives from the host processor or the GPU a procedure call representing a launch of the first function and, in response, launches the second function, wherein information identifying a collection of data points is received in the procedure call;
launches a plurality of threads in the GPU, each thread executing the second function for a subset of the data points; and
in response to receiving the procedure call from the GPU, and prior to launching the second function:
allocates metadata for the first function, wherein the metadata include resource requirements of the first function or locations of resources needed for execution; and
configures the launch of the second function using the metadata.

11. The processing system of claim 10, wherein the driver further:
generates a third function which returns a pointer to the allocated metadata; and
calls the third function and uses the returned pointer in configuring the launch of the second function.

12. The processing system of claim 11, wherein the driver further relocates the first function in memory to a location adjacent to instructions branching to the second and third functions.

13. The processing system of claim 10, wherein the driver further receives signals from one or more of the threads upon completion of the second function by the one or more threads.

14. The processing system of claim 13, wherein the driver further:
returns from the procedure call upon launching the plurality of threads; and
signals completion of the second function in the threads using a synchronization barrier.

* * * * *